May 30, 1961     R. G. RIEDESEL ET AL     2,985,941
WOOF FABRIC AND METHOD OF MAKING
Filed Oct. 8, 1956
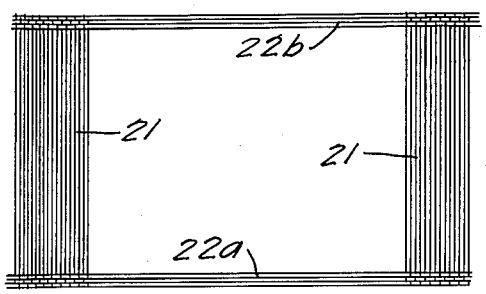
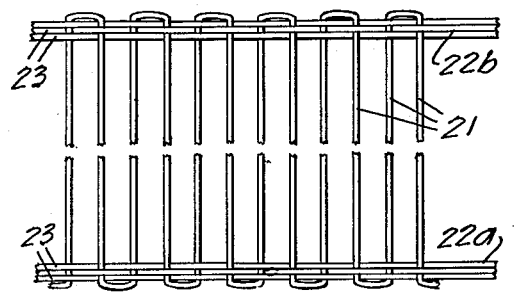
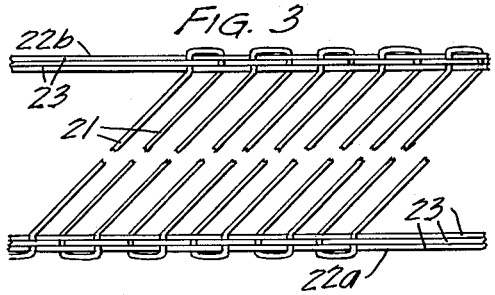
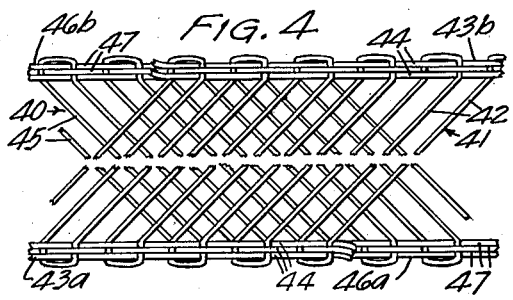
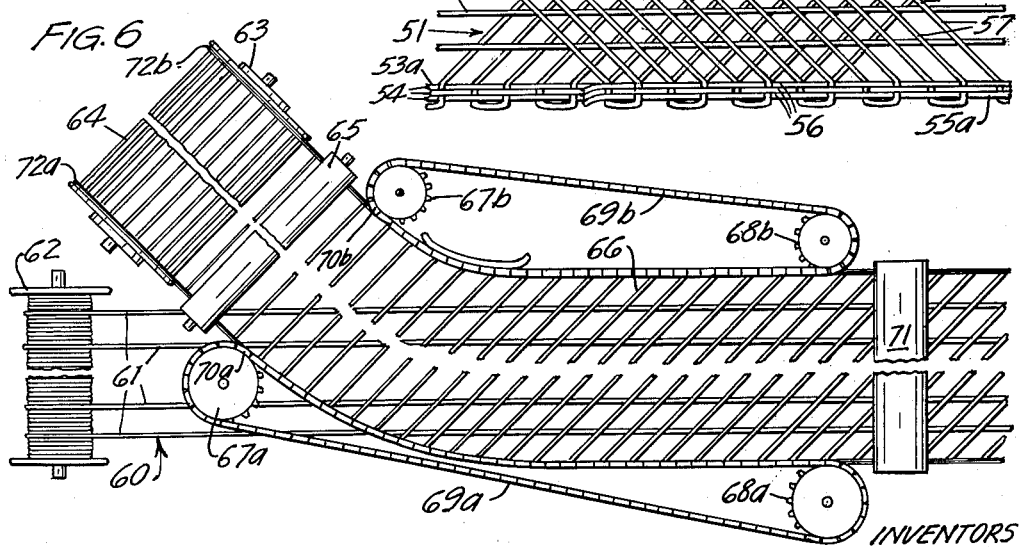
INVENTORS
RICHARD E. BRINK
RICHARD G. RIEDESEL
BY
Carpenter, Abbott, Coulter & Kinney
ATTORNEYS

United States Patent Office 2,985,941
Patented May 30, 1961

2,985,941

WOOF FABRIC AND METHOD OF MAKING

Richard G. Riedesel, Stillwater Township, Washington County, and Richard E. Brink, White Bear Township, Ramsey County, Minn., assignors to Minnesota Mining and Manufacturing Company, St. Paul, Minn., a corporation of Delaware Filed Oct. 8, 1956, Ser. No. 614,642

15 Claims. (Cl. 28—73)

Our invention relates to a novel textile material and to a method for making it. It also relates to the incorporation of this material in a reinforced web.

Our invention particularly relates to the formation of a continuous sheet of reinforcing threads aligned crosswise to the longitudinal direction of the sheet. Still more particularly it relates to the formation of a continuous, handleable textile material which is essentially a woof; i.e., it has many long juxtaposed woof threads but it has warp threads only at the widely separated lateral edges.

An object of this invention is to provide a supply of laterally aligned threads for direct incorporation into a resinous web.

Another object of this invention is to provide a means for laminating laterally aligned threads in continuous form from a supply roll to a web. As defined herein, a web may comprise paper, cloth, a mat, a plane or warp yarns, a film, or a similar roll of laterally aligned threads.

Another object of this invention is to provide a simple, inexpensive method of manufacturing laminates comprising one or more planes of parallel nonwoven lineally aligned threads or the like.

A specific object of this invention is to provide a simple, inexpensive means to continuously laminate three planes of parallel lineally aligned nonwoven threads or the like at 60° angles to each other to form a so-called "isotropic" fabric.

Another specific object of this invention is to provide a simple inexpensive means for continuously laminating two sheets of parallel laterally aligned nonwoven threads so as to cause the threads in one sheet to lie at substantially a 90° angle to the threads in the other sheet and at substantially a 45° angle to a lateral edge of the laminate.

Still another specific object of our invention is to provide lineally aligned nonwoven material of the types listed above which is impregnated with a curable resin and which can be stored in the partially cured "green" state.

It is old in the textile industry to prepare, handle, and use a beam of lineally aligned continuous threads which are referred to collectively as a warp. Since such threads can be wound on a conventional creel, they are relatively easily handled. Warp threads extend continuously in a direction longitudinally of the fabric to be woven, whereas filler, or woof, threads extend at a right angle to the edge of the fabric to be woven. The filler threads are interlaced with the warp threads by means of a shuttle which is driven rapidly back and forth in a loom between the appropriately displaced warp threads. Since a woof seemingly depends for its very existence upon the presence of warp threads, it has never before been known to exist independently. We have found that an independently existing woof is especially useful for incorporating in resin-reinforced laminates, and our invention provides not only an essentially independently existing woof, but also a means for incorporating it in such laminates. Our novel woof fabric is remarkably useful, strong and versatile.

Referring now to the attached drawings, which exaggerate certain features in order to clarify the structure of the fabrics and apparatus shown:

Figure 1 represents a plan view of a portion of a novel woof fabric of our invention.

Figure 2 is an exaggerated view of the woof fabric of Figure 1, with the filler threads shown a substantial distance apart for greater clarity.

Figure 3 shows the woof fabric of Figure 2 with one selvage edge moved in a longitudinal direction relative to the other selvage edge so as to result in the filler threads running at a 45° angle to the selvage edges.

Figure 4 illustrates the superimposition of two woof fabrics similar to that shown in Figure 2 but displaced in opposite directions in the manner of Figure 3, with a portion of the selvage edges of the upper woof fabric cut away for greater clarity.

Figure 5 illustrates two woof fabrics similar to those of Figure 4, but having a plane of warp therads interposed.

Figure 6 is a somewhat stylized plan view of a modified tentering apparatus suitable for preparing and laminating products of the general type described in the previous drawings.

In Figure 1, filler threads 21 are shown lying in parallel laterally juxtaposed relation. They are intercepted by and woven with warp threads only at widely separated selvage edges 22a and 22b.

In Figures 2 and 3, filler threads 21 extend throughout the body of the fabric, but warp threads 23 appear only at the selvage edges 22a and 22b. (The distance between the filler threads is pictured greater than usual to render the constructional features more understandable.)

Figure 4 illustrates a laminate of two woofs 40 and 41, each having filler threads and selvage edges. The edges 43a and 43b of woof 41 (made up of individual warp threads 44 and filler threads 42) directly overlie the edges 46a and 46b respectively of woof 40 (made up of individual warp threads 47 and filler threads 45). Selvage edges 43b and 46b have been moved with respect to selvage edges 43a and 46a so that filler threads 42 are at an angle of +45° to selvage edges 43a and 46a, and filler threads 45 are at an angle of −45° to selvage edges 43a and 46a. (Positive and negative angles as set forth herein are so designated according to trigonometric convention.)

Figure 5 illustrates a three-ply laminate consisting of two woofs 50 and 51 with an interposed warp 58. As in Figure 4, each woof has filler threads and selvage edges. Selvage edges 55a and 55b of woof 50 (made up of individual warp threads 56 and filler threads 57) directly overlie selvage edges 53a and 53b of woof 51 (made up of individual warp threads 54 and filler threads 52) respectively. Selvage edges 53a and 53b are so adjusted as to cause filler threads 52 to extend at an angle of +60° to selvage edge 53a. Warp threads 59 of warp 58 are placed above filler threads 52, below filler threads 57, and parallel to selvage edges 53a and 53b. Selvage edges 55a and 55b are so adjusted as to cause filler threads 57 to extend at an angle of −60° to selvage edge 55a. Lamination of the two woofs to the warp and the subsequent slitting off of selvage edges 53a, 55a, 53b, and 55b will result in a nonwoven "isotropic" laminate having three sheets of threads at 60° angles to each other.

In Figure 6, a roll of handleable woof fabric 64 similar to that shown in Figure 1 is arranged on rotatably mounted drum 63. It passes under leveling roll 65, and selvage edges 72a and 72b are engaged by clips 70a and 70b of endless tenter chains 69a and 69b. The clips pass around engaging gears 67a and 67b and follow the rails (not shown) of the tenter frame, which are arranged to complete a 45° turn while the tenter chains 69a and 69b move at the same rate of speed, passing around driving gears 68a and 68b respectively. The effect of this turning is to cause a reduction in the width of the woof fabric 64 and to cause the individual filler threads 66 to come closer together and to be arranged at an angle of 45° to the selvage edges of said woof fabric 64, thus forming a biased woof fabric. A beam 60 of warp yarns previously impregnated with a heat-softenable plastic is drawn from rotatably mounted creel 62 and positioned beneath the biased woof fabric. The individual yarns 61 of the warp 60 are essentially contiguous but are shown widely spaced for greater clarity. The biased woof fabric and the impregnated warp yarns merge at heated squeeze rolls 71 (lower roll not shown). The temperature maintained is sufficient to soften the plastic and bond the two fabrics together to form a continuous product with filler threads laminated at an angle of 45° to warp yarns. This product can be further impregnated, subjected to additional laminations, coated, and/or wound into a roll.

To achieve a desired degree of bias distortion, drum 63 may be arranged at some angle other than 45° to the heated squeeze rolls 71 and the rails of the tenter frame adjusted accordingly to compensate for the different width of the bias fabric which necessarily results.

Other readily apparent means for securing the warp and biased woof together include bonding to a common film or applying adhesive by spray or roll coat methods prior to entering the squeeze rolls. Similarly, the squeeze rolls can be replaced by an intermittent press, movable platens, or the like.

A highly specialized laminate made by our improved method is employed as a splicing tape for coated abrasive belts according to the method disclosed in U.S. Patent No. 2,733,181, issued to R. G. Riedesel. In the fabrication of splices described in this patent, it is desirable to use a narrow continuous roll of splicing tape comprising a heat-flowable flexible resin film containing two lineally aligned planes of parallel yarns, the yarns of one plane extending at an angle of +45° to the edges of the tape, and the yarns of the other plane extending at an angle of −45° to the edges of the tape. Such a splicing tape can be positioned above the longitudinally serrated abutting edges of sheet material cut at 45°, preparatory to forming an endless belt therefrom, so that one plane of said yarns contacts the surface of the sheet material and extends parallel to the length of the belt and the other plane of said yarns extends at right angles to the edge of the belt. Under the the application of heat and pressure the resin film softens and the yarns which contact the surface of the sheet material are flowed into the serrations cut into the abutted belt ends. Obviously a laminated nonwoven product is substantially better suited than a woven fabric would be for this purpose, because the over-and-under relationship of woven threads prevents satisfactory peneration of the threads and their component fibres into the serrations. Conventional continuous laminates having yarns extending parallel to the machine direction of the laminate cannot conveniently be slit into narrow rolls for easy positioning in making a 45° splice as recited in U.S. Patent No. 2,733,181 without the undesirable presence of such yarns in the splicing area and extending parallel to the cut belt ends.

We prepare a splicing tape for use with above-cited U.S. Patent No. 2,733,181 as follows:

At each extreme lateral edge of a conventional 42-inch loom we provide a one-half inch warp band containing 28 ends of 150 1/0 glass yarns. The inner eges of the one-half inch warp bands are located 41 inches apart. We then provide a shuttle loaded with 150 1/0 glass yarns and "weave" the shuttle-carried yarns through and between the widely spaced warp bands to form a material having 56 picks of filler yarn per inch of length. Although there are no warp yarns in the middle 41 inches of this 42 inch "fabric," the final product is nevertheless a handleable, extremely useful textile material. We next prepare a similar 42 inch fabric from 70 denier nylon filaments woven to have no warp yarns except at the extreme lateral (or selvage) edges and having fifty-six picks of filler yarn per inch of length. Although these "woofs" or "woof fabrics" can then be treated in several ways, we prefer to work with them in a conventional tenter. (A tenter is a standard textile machine for handling cloth and the like while gripping it only at the edges. The conventional use of a tenter is to maintain a predetermined width of cloth while processing it, i.e., saturating, drying, impregnating, etc.) We displace the left selvage edge of the glass fabric with respect to its right selvage edge to cause the glass filler yarns to lie at an angle of −45° to the selvage edges. This displacement reduces the width of the glass "woof" fabric between the selvage edges to about 31 inches. The displacement similarly increases the number of glass filler yarns per inch of distance measured at right angles to said filler yarns to about 79. The absence of warp threads in the main body of the cloth permits this distortion to take place without disturbing the parallel alignment of the filler threads. The nylon woof fabric is now similarly but oppositely manipulated to produce a 31-inch biased woof fabric having the nylon filler yarns aligned at an angle of +45° to the selvage edges. Having so aligned the yarns of the two woof fabrics, we position the glass woof fabric above the nylon woof fabric, simultaneously grasping the superposed selvage edges with a tenter as hereinabove described, and drawing the filler threads taut. We separately prepare a heat-sensitive film by mixing equal parts of an "A" stage phenolic resin and a polyvinyl butyral resin, diluting to about 27% solids, coating on a temporary carrier web, and drying 60 minutes at 150° F. to evaporate the solvent. We laminate the superposed woofs to the heat-sensitive film by placing them above the film and its temporary carrier and simultaneously passing the woofs and the carrier-supported film through squeeze rolls heated to 250° F. Under these conditions the film flows sufficiently to bond the two woof fabrics together. After cooling, the temporary carrier web is removed and the impregnated woof fabrics wound into a roll. This 31-inch wide glass-nylon bias laminate is suitable for many purposes; e.g., it may be molded to conform to various contours or it may be further laminated to other materials, to which it imparts both strength and resilience. An especially valuable specific use is found in the fabrication of abrasive belt splices as taught in hereinabove cited U.S. Patent No. 2,733,181. With this use in mind, we slit the impregnated glass-nylon biased woof fabric laminate longitudinally and wind it into rolls of tape having a width of about one-half inch. Under heat and pressure a strip of this splicing tape is then adhered to the back of cut, serrated, and juxtaposed belt ends, as set forth in previously mentioned U.S. Patent 2,733,181, said belt ends having been cut at an angle of 45°. The glass yarns are aligned next to the backing parallel to the longitudinal direction of the belt and flow into the serrations, while the nylon yarns are adhered firmly to the splice area at an angle of 90° to the serrations so as to prevent splitting of the belt at this point.

A laterally strong conformable sheet material can be made by impregnating a single thickness of woof fabric with a suitable resinous material, curing the resinous material to a handleable further curable "green" state, and slitting off the selvage edges.

Strong, conformable structural members may also be readily prepared by appropriately combining a plurality of woof fabrics with or without additional web material. Pipe fittings, beams, channel members, and the like may all be satisfactorily fabricated. For certain applications requiring maximum strength in one direction, it may be desirable to have the filler threads of all woof fabrics aligned in substantially the same direction. The selvage edges supply considerable longitudinal strength, and it may be desirable to retain them in the finished product. The impregnating medium itself may supply adequate strength in other directions. For certain other applications, the selvage edges of the bias fabrics may be slit off after the filler threads are satisfactorily adhered to a web or the like.

Filler material may comprise threads, yarns, strings, filaments, fibers, cords, strands, and the like without deviating from the spirit and scope of our invention. For ease in handling our woof fabric in roll form, it may be desirable to wind a liner of paper or the like between layers.

Although we have described a method of preparing a woof fabric wherein warp threads are provided primarily only at the selvage edges, it is entirely possible to produce a readily handleable more conventional-appearing fabric in which temporary warp yarns consisting of a readily soluble fiber are used in combination with filler threads which are not soluble in the same solvent. One suitable warp fiber is casein, which can be dissolved in caustic. Another suitable warp yarn is acetate rayon, which can be dissolved, e.g., in acetone or acetic acid. It is somewhat more difficult to bias the filler threads in this fabric, which finds greatest use where it is desired to laminate threads at right angles to the edges of a web. After lamination to the desired web, the temporary warp yarns are dissolved and either removed or used as at least part of a laminating adhesive.

Having described our invention, what we claim is:

1. A longitudinally strong conformable laminate comprising a longitudinally strong self-sustaining woof fabric capable of being wound in roll form, said fabric having a multiplicity of closely spaced parallel filler threads held only at widely separated selvage edges by closely spaced interwoven warp threads, the selvage edges of said fabric substantially coinciding with the lateral edges of the laminate, the filler threads of said fabric being disposed at an acute angle to said selvage edges, and a flexible conformable web adhered to said woof fabric.

2. The laminate of claim 1 in which said web is a plane of warp threads.

3. The laminate of claim 1, further characterized by being impregnated with a heat-softenable plastic material.

4. The laminate of claim 1 in which said web is a second woof fabric as defined in claim 1, the filler threads of said web intersecting the filler threads of the woof fabric at an acute angle.

5. The laminate of claim 4 in which the filler threads of one woof fabric comprise glass filaments and the filler threads of another woof fabric comprise nylon filaments.

6. A laminate comprising at least one plane of warp threads and a plurality of separately handleable woof fabrics in each of which fabrics lineally aligned filler threads are interwoven with warp threads only at widely spaced selvage edges, the filler threads of each of said woof fabrics crossing the threads of said warp at about a 60° angle and crossing the filler threads of at least one other of said woof fabrics at about a 60° angle, neither said plane of warp threads nor any of said woof fabrics being interwoven with any other woof fabric.

7. The method of continuously forming a longitudinally strong conformable sheet product capable of being wound into a roll, slit longitudinally, cut to length as needed, and used for joining the serrated and abutting acute-angularly cut ends of coated abrasive sheet material so as to provide a longitudinally strong, flexible splice reinforced by a plane of lineally aligned fibers extending parallel to the longitudinal direction of said sheet material, said sheet product having tightly interwoven warp threads and filler threads at widely separated lateral edges, said filler threads lying parallel to each other and at an acute angle to said edges, said method comprising the steps of: providing a continuous self-sustaining woof fabric capable of being wound in roll form, said fabric having a multiplicity of closely spaced parallel filler threads held at widely separated selvage edges by closely spaced interwoven warp threads, the portion of said fabric intermediate said selvage edges containing no warp threads; continuously displacing one of said selvage edges longitudinally with respect to the other selvage edge, thereby aligning said filler threads parallel to each other and at an acute angle to said selvage edges; and continuously adhering said fabric to a flexible conformable web.

8. The method of claim 7 in which the web comprises a warp having no filler threads woven therewith.

9. The method of claim 7 in which the web comprises a fabric having a minor proportion of warp threads and a major proportion of filler threads, the filler threads of said web being laminated to the filler threads of the woof fabric at a substantial angle.

10. The method of claim 7 in which the web comprises a self-supporting flexible resin film.

11. The method of claim 7 in which the filler threads of the woof fabric comprise glass filaments and the filler threads of the web comprise nylon filaments.

12. The method of claim 9 in which the glass and nylon are laminated at an angle of 90° to each other and 45° to the edge of the laminate.

13. The method of forming a laminate including the steps of interweaving filler threads with warp threads, said warp threads being provided only at the edges of the fabric, thereby to form a woof fabric, continuously displacing one of said edges longitudinally with respect to the other of said edges, thereby aligning said filler threads parallel to each other and at an acute angle to said edges, adhering said woof fabric to a web, and removing the warp threads.

14. The method of forming a continuous nonwoven multilayer thread-reinforced product capable of being wound into a roll by laminating to a web a woof fabric comprising a pulitiplicity of parallel laterally aligned filler threads held at widely spaced selvage edges by warp threads, the main body of said woof fabric containing no warp threads, including the steps of (1) continuously displacing one of said selvage edges longitudinally with respect to the other selvage edge to align said filler threads at a predetermined acute angle to said selvage edges, (2) adhering the aligned fabric to said web, and (3) slitting off said selvage edges.

15. The method of forming a laminate including the steps of interweaving filler threads with soluble warp threads, said warp threads being provided only at the edges of the fabric, thereby to form a woof fabric, continuously displacing one of said edges longitudinally with respect to the other of said edges, thereby aligning said filler threads parallel to each other and at an acute angle to said edges, adhering said woof fabric to a web, and dissolving the warp threads from said fabric.

References Cited in the file of this patent

UNITED STATES PATENTS

| | | |
|---|---|---|
| 638,247 | Hyatt | Dec. 5, 1899 |
| 662,963 | Preston et al. | Dec. 4, 1900 |
| 670,413 | Tillinghast | Mar. 19, 1901 |
| 1,618,903 | Ammann-Haberstich | Feb. 22, 1927 |
| 1,834,556 | Toles | Dec. 1, 1931 |
| 1,905,916 | Leguillon | Apr. 25, 1933 |
| 1,917,834 | Gillies | July 11, 1933 |
| 2,147,736 | Dreyfus | Feb. 21, 1939 |
| 2,184,326 | Thomas | Dec. 26, 1939 |
| 2,501,208 | Cheldin | Mar. 21, 1950 |
| 2,537,323 | Wurzburger | Jan. 9, 1951 |
| 2,574,221 | Modigliani | Nov. 6, 1951 |
| 2,696,243 | Holland | Dec. 7, 1954 |
| 2,703,774 | Morrison | Mar. 8, 1955 |
| 2,733,181 | Riedesel | Jan. 31, 1956 |

UNITED STATES PATENT OFFICE
CERTIFICATE OF CORRECTION

Patent No. 2,985,941                          May 30, 1961

Richard G. Riedesel et al.

It is hereby certified that error appears in the above numbered patent requiring correction and that the said Letters Patent should read as corrected below.

Column 2, line 19, for "therads" read -- threads --; column 3, line 56, for "peneration" read -- penetration --; line 68, for "eges" read -- edges --; column 6, line 20, for the claim reference numeral "7" read -- 9 --; line 23, for the claim reference numeral "9" read -- 11 --.

Signed and sealed this 31st day of October 1961.

(SEAL)
Attest:

ERNEST W. SWIDER                              DAVID L. LADD
Attesting Officer                                  Commissioner of Patents

USCOMM-DC